Patented Sept. 4, 1945

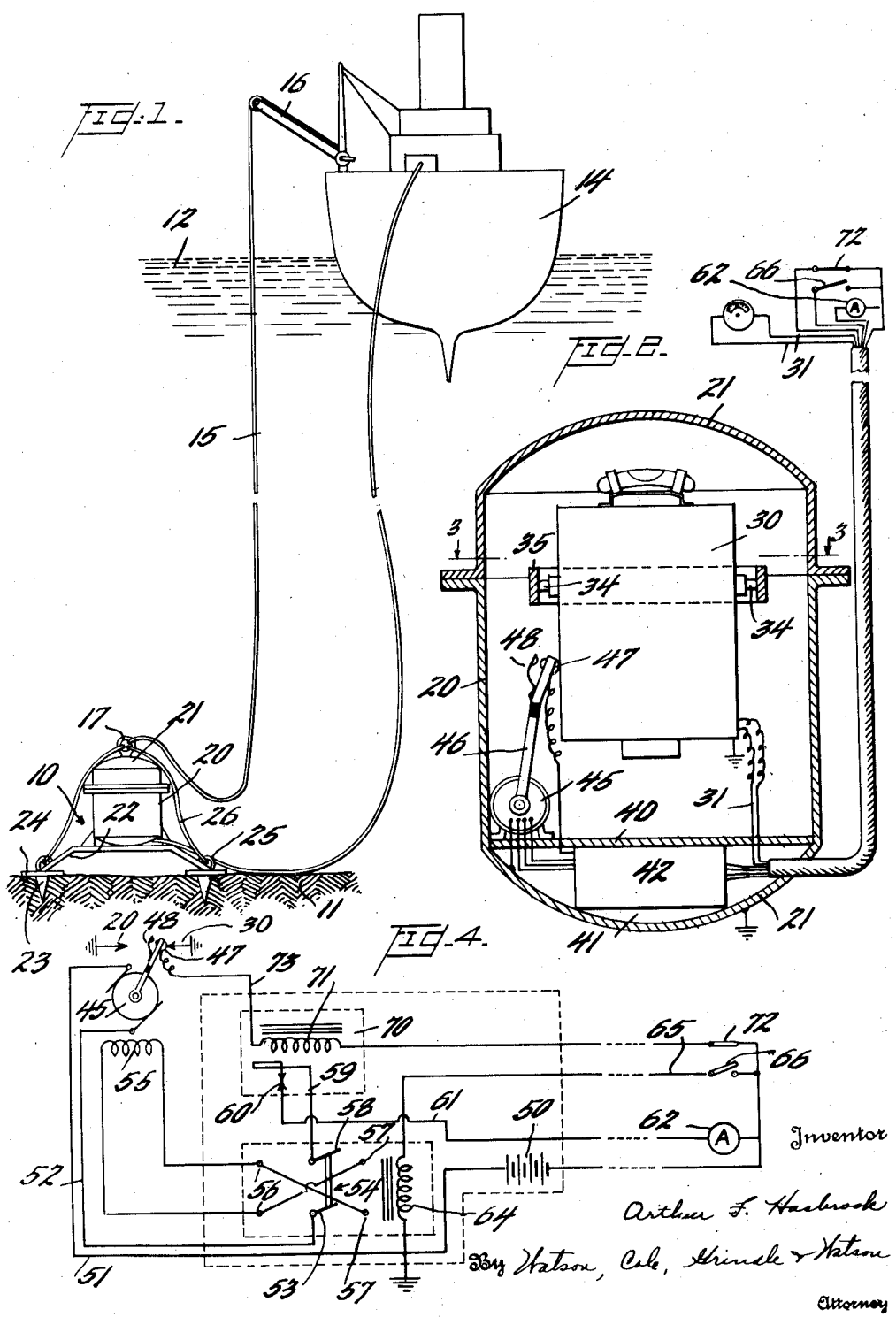

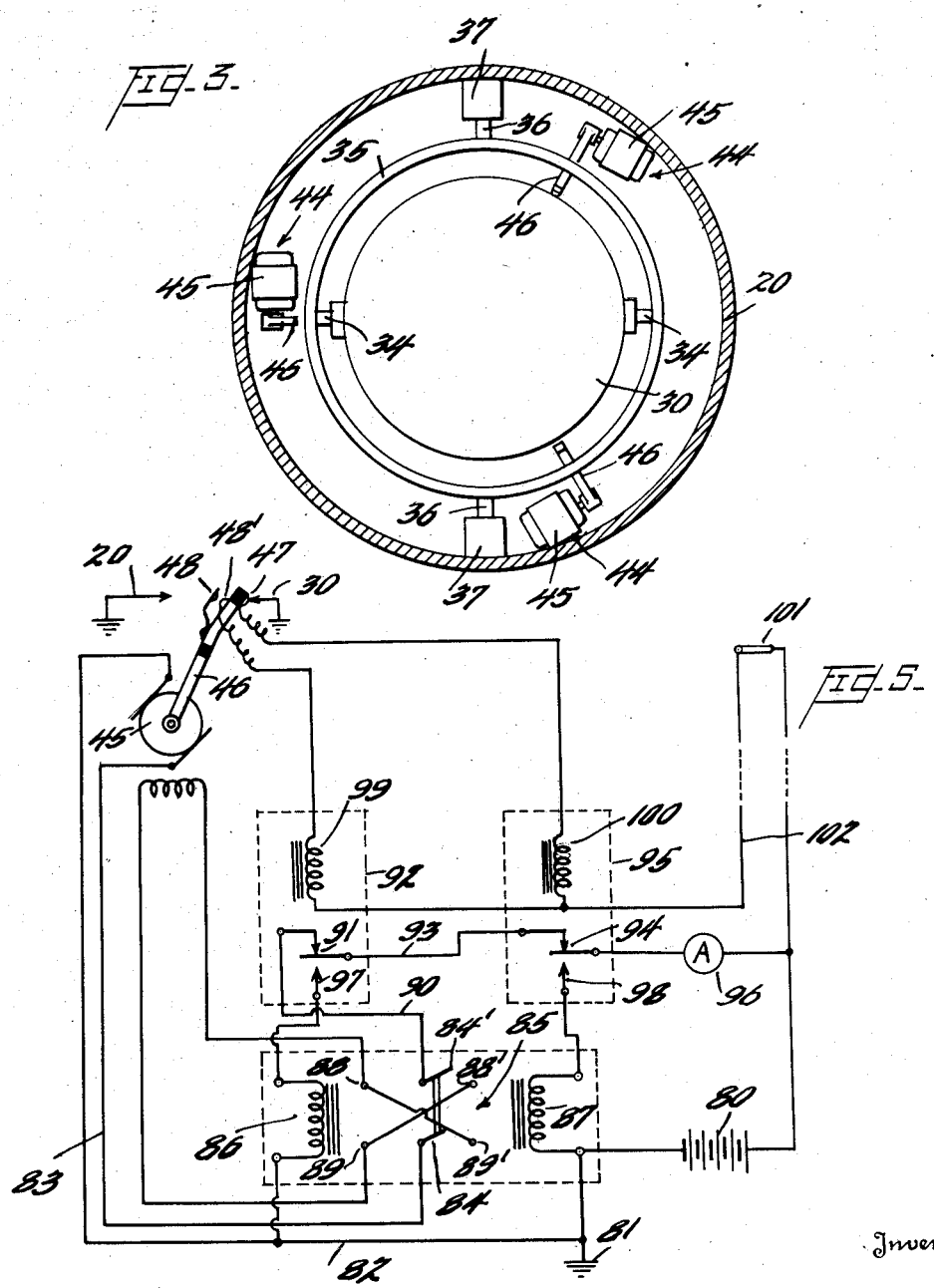

2,383,966

UNITED STATES PATENT OFFICE 2,383,966

GEOPHYSICAL PROSPECTING APPARATUS

Arthur F. Hasbrook, San Antonio, Tex., assignor to Olive S. Petty, San Antonio, Tex.

Application March 18, 1943, Serial No. 479,631

11 Claims. (Cl. 73—382)

This invention relates to apparatus for submarine geophysical prospecting and more particularly to the mounting, leveling, protecting, and handling of such delicate apparatus.

It is a general object of the present invention to provide novel and improved submarine geophysical prospecting apparatus and associated equipment.

More particularly it is an object of the invention to provide submarine geophysical prospecting apparatus including a water-tight housing and cased instrument suspended within the same for substantially automatic leveling, together with compensating leveling apparatus and clamping means whereby the casing and housing may be locked together as a protection to the delicate apparatus during handling, lifting, and submerging of the housing.

It is an important feature of the invention to arrange motor operated clamping means adapted to be extended between the housing and casing for locking the same against relative movement and including automatic stopping means for the clamp actuating motors.

Other and further objects and detailed features of the invention will be more apparent to those skilled in the art upon a consideration of the accompanying drawings and following specification wherein are disclosed several exemplary embodiments with the understanding that they may be variously combined, modified, or changed in accordance with the scope of the appended claims without departing from the spirit of the invention.

In said drawings:

Figure 1 is a view illustrating apparatus constructed according to the present invention shown positioned on the floor of a body of water and arranged to be controlled and operated from a surface craft;

Figure 2 is a transverse vertical section through the housing showing the universal mounting for the casing and the clamping of apparatus therefor;

Figure 3 is a transverse section taken on line 3—3 of Figure 2;

Figure 4 is a schematic wiring diagram of one embodiment for the control of one of the casing clamping motors; and Figure 5 is a view similar to Figure 4 but illustrating a second embodiment of clamping motor control.

It is often desirable or essential, in carrying out various types of geophysical reconnaissance, to work over submerged areas which are included in the terrain being considered. No satisfactory way has even been worked out for carrying the equipment necessary for this work and using the same from a surface craft. Such apparatus which may include gravity meters, torsion balances, magnetometers, and the like, is extremely delicate and sensitive to movement, variation in level, etc. It cannot be maintained sufficiently stationary and level on any known form of surface craft to produce reliable results. For this reason, resort must be had to housing the equipment in a waterproof chamber which is lowered to the floor of the body of water, substantially mounted thereon and then accurately leveled. It has heretofore been proposed to suspend the instrument, which is normally arranged in a closed casing, from the walls of the water-tight housing by means of gimbals or pendulum-like suspensions. These types of suspensions, however, because of inherent friction and other faults, partially contributed to by the presence of moisture, corrosion, and the like, cannot be relied upon to provide the high degree of accuracy of leveling which is so essential to the making of satisfactory records. In my divisional application Serial No. 521,665, filed February 9, 1944, there is described and claimed apparatus for automatically making the necessary minute adjustments after the apparatus has found a substantial level from its suspension equipment.

Where the housing suspends the inner casing from gimbals or other similar means, some method of clamping the two parts together, to prevent any relative movement while the whole assembly is being lowered into or lifted from the water and while it is being handled or mounted aboardship, is a prime requirement, for otherwise the extremely delicate apparatus might be seriously damaged. In accordance with the present invention automatic clamping apparatus is provided, driven by small reversible electric motors and adapted to project clamps from one of the parts toward the other, automatic stopping circuits being provided which are brought into operation upon the contacting of the clamps with either of the parts.

Referring now to the drawings and first to Figure 1 for a general disclosure of the apparatus and the mode of using the same, it will be noted that the submersible geophysical prospecting equipment 10 is resting on the bottom or floor 11 of a body of water 12, at the surface of which is the vessel 14, navigable in the water and anchored, in a manner not shown, to be nearly vertically above the apparatus. A suitable handling cable 15 swung from a hoisting boom 16 on the boat is attached to a ring 17 at the top of the apparatus and is used for lowering and lifting the same.

The apparatus is fully enclosed in a water-tight housing 20 of cylindrical form provided with convex heads 21. It is provided with tripod legs 22 each having a sharp vertical spike 23 thereon, topped by a broad flat plate 24 to limit penetration into soft subsoil. Each leg is conveniently provided with a ring 25 to which the bridles 26 are attached which merge into the hoisting ring 17. The tripod legs are well spread to give a stable support to the apparatus which has sufficient initial weight to locate itself firmly on the bottom, be it soft or hard, so that the apparatus may remain in a fixed position after a brief period for settling. The exact form of the outer housing and the arrangement of its supporting legs and feet form no part of the present invention which primarily deals with the mounting, clamping, and leveling of the geophysical apparatus within the water-tight housing.

In Figure 2 the housing, minus its supporting and hoisting parts, is shown at 20 and within the same is the casing 30 of any desired type of instrument used for geophysical prospecting. For the sake of this description this will be hereinafter referred to as a gravity meter. Such a meter is preferably enclosed in a casing 30 which may be water-tight and heat-insulating. The form of gravity meter preferred for use in this arrangement is one such as illustrated in the copending application of Olive S. Petty, Serial No. 366,495, which is of the electrical type capable of exhibiting its readings at a remote point. The particular advantage of such an arrangement is that the readings may be conducted to the surface through conductors 31 passing in a water-tight manner through the casing 30 and housing 20 and extending to the surface cabled with other conductors later to be described.

As seen both in Figures 2 and 3, the casing 30 is provided on the extension of one of its diameters with trunnions 34, journalled in a gimbal ring 35 having trunnions 36 on an axis at right angles to that containing the trunnions 34 and which are journalled in bosses 37 in the housing 20. The horizontal disposition of the gimbal supporting arrangement is well above the center of gravity of the instrument assembly and casing 30 so that the same tends to come to a level automatically. However, certain inequalities in the bearing, the inability to make them entirely friction-free, the necessity for lubricant to prevent corrosion, the variations in temperature taking place, the presence of moisture, and the stiffness of the conductors 31, all make it impossible to rely on the instrument coming to an exact level within the tolerances permitted for proper operation of the gravity meter. Means are therefore provided such as shown in Figures 6 and 7, and which will be later described, for bringing the apparatus to an exact level.

Naturally the gimbal bearings and pivots are quite free so that the casing 30 can move about within wide limits in the housing. The instrument in the casing 30 is extremely delicate because of its high sensitivity and cannot stand much shaking about. In order to prevent relative movement between the cased instrument and the housing a system of clamps is provided adapted to lock the two parts together when desired and to release them so that the instrument can find its level after the whole device has been set on the floor of the body of water. In general the clamping means may be said to comprise arms which can be projected from one of the parts to be locked toward and into engagement with the other, together with electrical means for stopping the movement when this engagement takes place. In the embodiment shown, the clamping devices are carried by the housing and specifically from the sub-floor 40 therein which provides a bottom compartment 41 in which some of the auxiliary apparatus 42 may be housed.

As seen in Figure 3, the clamping devices 44 are three in number disposed at 120° intervals about the casing and each includes a slow speed or geared electric motor 45 of the reversible type and an arm 46 movable by the motor so that its tip engages the casing 30 well below the plane of the gimbal support. For purposes which will be later described, the arms are either formed of insulating material or are insulated from the motor or from the contact devices 47 and 48 at their ends.

It will be appreciated that the housing when in position on the floor of the body of water may rest at a substantial angle from the vertical, whereas the axis of the casing 30 should be truly vertical. This means then that when locking takes place preparatory to lifting the apparatus, that the arms 46 on the several motors will have to move different distances if they are each to just snugly engage the casing. To provide for this variation in the amount of movement of the several arms, each one is arranged with a contact device 47 positioned to engage the casing 30 and make electrical contact therewith. The closing of a circuit by this engagement actuates mechanism about to be described which stops the motor.

In a like manner, when the arms are withdrawn, they may have to travel different distances so that back-stops may be provided but preferably for the sake of simplicity the arms merely swing in a reverse direction until they engage the inner wall of the housing. A spring contact 48 on each arm is conveniently arranged to touch the housing wall and to engage the rear end of the contact 47 to close a circuit which stops the motor when the arm has reached its fully retracted position.

Referring now to Figure 4 for one embodiment of the circuit arrangement for any one of the motors for the clamping arms, it will be noted that power for motor operation is supplied from a suitable battery 50. The motor 45 is of the series wound type and its armature is directly connected to one pole of the battery by conductor 51. The other terminal of the armature is connected by conductor 52 to one of the movable arms 53 of the reversing switch 54. The field 55 of the motor is connected to the stationary contacts 56 and the reverse pair 57 at the opposite end of the switch. The other movable arm 58 is connected through conductor 59, relay contacts 60, conductor 61, ammeter 62, back to the opposite side of the battery. It will be noted that with the movable switch arms 53 and 58 positioned to the right, that the armature and field of the motor are arranged in series so that the same will run in one direction, and that when the arms 53 and 58 are moved to the opposite set of stationary contacts the direction of current flow through the field only of the motor will be reversed and the armature will rotate in the opposite direction.

The reversing switch is so constructed that the movable arms, biased to engage the same set of stationary contacts, can be caused to engage the other set by energization of a solenoid or magnet 64 having one end of its winding connected to the conductor 51 and the other connected back to the battery through a conductor 65 and a switch 66 aboard the vessel. When the switch 66 is closed, the reversing switch is actuated, and remains in the new position only as long as current flows in magnet 64.

The contacts 60 of the relay 70 are normally closed but are held open as long as the winding of magnet 71 of the relay is energized. This relay winding receives its current from the battery through the normally closed switch 72 aboard the vessel and through the wire 73 leading by means of a flexible pigtail to the contact 47 on the locking arm 46. In Figure 4 the grounded contacts on either side of the locking arm represent the casing 30 and the housing 20, both of which are at ground potential as is the conductor 51 leading from the left-hand side of the battery 50. When the switch 72 is closed, a circuit is completed through winding 71 to energize the same by the engagement of the contact 47 on the locking arm with either the housing 20 or the casing 30. Assuming that the casing is locked by having the arms positioned as shown in Figures 2, 3, and 4, it will be seen that under these conditions magnet 71 is energized, contacts 60 are separated, and the motor is stopped. This will be indicated on ammeter 62 also aboard the ship and in the motor circuit.

When it is desired to release the casing, the switch 66 controlling the reversing relay is placed in the proper position, either open or closed, depending upon the direction of rotation of the motor in the normal setting of this reversing relay, and the switch 72 is momentarily opened. Upon this latter switch opening, the contacts 60 drop closed, the motor is started and the contact 47 is separated from casing 30. The starting of the motor will be indicated on the ammeter 62 and the switch 72 can then be allowed to close automatically since the relay winding is de-energized by the separation of contact 47 from the casing. The motors 45 are geared for very slow speed operation. When the arms 46 release the casing 30, continued movement thereof advances the contacts 48 into engagement with the housing 20 and they are pressed into contact with the rear end of contact 47, again energizing relay winding 71, opening switch contacts 60, and stopping the motor. The apparatus is now in condition for leveling and taking readings, after which switch 66 is actuated to set the reversing switch as desired, switch 72 is momentarily opened, and the arms move in to engage and clamp the casing to ready the apparatus for hoisting.

Although the circuit for but a single one of the motors 45 has been shown, it will be clear that they will each operate in the same manner and can be ganged to receive power from the same battery and to make use of a common reversing switch. Each will require a separate relay for stopping purposes since they will not always all make the same length stroke. The surface switches 66 and 72 can serve for all three motors, thus simplifying the cable passing to the surface as well as the operation of the motors.

In Figure 5 is shown a modification of the circuit of Figure 4 which is more nearly automatic in that each stopping of the clamping motor automatically sets it for movement in a direction the reverse of that from which it has just stopped so that aboard the boat all that is required is a single switch for initiating operation of the motor. If desired, an ammeter directly in the motor circuit can also be arranged at the surface to indicate to the operator that the device is functioning. In this embodiment the structure is somewhat modified. The arm on the motor is preferably of insulating material and carries not only the contact 47 for engaging the casing 30 and the contact 48 for engaging the housing 20, but a supplementary contact 48' engageable by contact 48 when it is pressed against the housing.

The battery 80 which provides the power, in this construction, is grounded as at 81 and leads through conductor 82 to one side of the armature, the other side being connected by wire 83 to one arm 84 of reversing switch 85. This switch is of the type having two actuating magnets 86 and 87. The energization of either one moves the switch in a direction to reverse the operation of the motor from that achieved when the opposite one was energized, and the switch always stays in the position to which it has been moved by one magnet until the other is energized. The lower side of each winding 86 and 87 is appropriately connected to the conductor 82. Stationary contacts 88 and 89 and the companion cross-connected stationary contacts 88' and 89' are appropriately connected to the field of the series motor 45 as shown so that the motor can be operated in either direction by moving the switch arms 84 and 84'. The arm 84' is connected through conductors 90, top contacts 91 of relay 92, conductor 93, top contacts 94 of relay 95, and ammeter 96, back to the opposite side of the battery. The circuit as shown and described is considered as operating the motor in an unclamping direction.

The upper terminals of reversing switch relay coils 86 and 87 are respectively connected to lower contact 97 of relay 92, and 98 of relay 95. These two relays 92 and 95 are single pole, double throw switches with the top contacts normally biased into engagement. These contacts are opened and held open by the energization of the respective relay coils 99 and 100, which coils are arranged to have their lower ends connected to the right-hand side of the battery through surface switch 101 and conductor 102. The upper ends of the windings 99 and 100 are respectively connected to motor arm contacts 48' and 47, which are each engageable with a ground as shown.

At the end of movement of arm 46 in the counterclockwise direction, 48 engages 20 and is pressed into contact with 48', thus energizing relay coil 99 from ground, through the coil, through closed switch 101 and back to the right-hand side of the battery. Energization of 99 pulls down the movable contact of this relay to engage stationary contact 97. Current then flows from the battery through the ammeter, through closed contacts 94, through reversing relay coil 86, and back to ground and to the battery, causing the reversing switch to change its position. The motor meanwhile has stopped since its circuit has been opened at 91.

When it is desired to move the clamping arms toward clamping position, surface switch 101 is momentarily opened. This de-energizes magnet 99, permits the closing of the contacts at 91, completing the motor circuit and operating the same in the direction opposite to that from which it was stopped by virtue of the reversal of switch 85 as just described. When contact 47 engages 30, the operation just described is repeated, making use of relay 100 and reversing switch magnet 87. It is to be noted that the switch 101 is opened only momentarily to start the operation of the motor and is then allowed to close automatically so as to provide a complete circuit when one of the clamping arm contacts engages a grounded surface. This switch, as well as that numbered 72 in Figure 4, may be of the momentary open circuit type. In this embodiment the operation of the reversing switch is entirely automatic. The ammeter is only in the circuit to indicate to the operator that the motor is running so that he knows that he can then release switch 101.

Having thus described the invention, what is claimed as new and desired to be secured by Letters Patent is:

1. Apparatus for geophysical prospecting on the floors of bodies of water comprising, in combination, a water-tight housing, means to support the same rigidly on such a floor, a cased geophysical instrument in said housing, gimbals supporting the instrument casing for self-leveling within the housing, a plurality of clamping devices each including means adapted to be extended between the housing and casing to lock them against relative movement, a motor adapted to move each of said means slowly, a control to start the motors from the water surface, and means to stop each motor automatically when its clamping means contacts one of the parts to be clamped together.

2. Apparatus for geophysical prospecting on the floors of bodies of water comprising, in combination, a water-tight housing, means to support the same rigidly on such a floor, a cased geophysical instrument in said housing, gimbals supporting the instrument casing for self-leveling within the housing, a plurality of clamping devices each including means adapted to be extended between the housing and casing to lock them against relative movement, a motor adapted to move each of said means slowly, a control to start the motors from the water surface, and means to stop each motor automatically when its clamping means contacts one of the parts to be clamped together, and means for conditioning each motor when stopped for operation in a reverse direction when next energized.

3. Apparatus for geophysical prospecting on the floors of bodies of water comprising, in combination, a water-tight housing, means to support the same rigidly on such a floor, a cased geophysical instrument in said housing, gimbals supporting the instrument casing for self-leveling within the housing, a plurality of clamping devices each including means adapted to be extended between the housing and casing to lock them against relative movement, a motor adapted to move each of said means slowly, and a control to start the motors from the water surface, and means in said housing limiting the said movement of said devices.

4. Apparatus for geophysical prospecting on the floors of bodies of water comprising, in combination, a water-tight housing, means to support the same rigidly on such a floor, a cased geophysical instrument in said housing, gimbals supporting the instrument casing for self-leveling within the housing, a plurality of clamping devices for securing the casing part and housing part against relative motion and carried by one of the parts, each clamping device including an arm adapted to be extended to engage the part which does not carry it, an electric motor adapted to move said arm slowly in either clamping or unclamping direction, means at the surface of the water to start the motor, means to maintain the motor in operation when started, and means to automatically stop the motor when said arm engages the part which does not carry it or a stop on the part which does.

5. Apparatus for geophysical prospecting on the floors of bodies of water comprising, in combination, a water-tight housing, means to support the same rigidly on such a floor, a cased geophysical instrument in said housing, gimbals supporting the instrument casing for self-leveling within the housing, a plurality of clamping devices for securing the casing part and housing part against relative motion and carried by one of the parts, each clamping device including an arm adapted to be extended to engage the part which does not carry it, an electric motor adapted to move said arm slowly in either clamping or unclamping direction, means at the surface of the water to start the motor, means to maintain the motor in operation when started, means to automatically stop the motor when said arm engages the part which does not carry it or a stop on the part which does, a reversing switch for said motor, and means to actuate said switch from the surface.

6. Apparatus for geophysical prospecting on the floors of bodies of water comprising, in combination, a water-tight housing, means to support the same rigidly on such a floor, a cased geophysical instrument in said housing, gimbals supporting the instrument casing for self-leveling within the housing, a plurality of clamping devices for securing the casing part and housing part against relative motion and carried by one of the parts, each clamping device including an arm adapted to be extended to engage the part which does not carry it, an electric motor adapted to move said arm slowly in either clamping or unclamping direction, means at the surface of the water to start the motor, means to maintain the motor in operation when started, means to automatically stop the motor when said arm engages the part which does not carry it or a stop on the part which does, a reversing switch for said motor, and means to automatically actuate said switch each time the motor stops to condition it for reverse operation on the next actuation of the motor starting means.

7. Apparatus for geophysical prospecting on the floors of bodies of water comprising, in combination, a water-tight housing, means to support the same rigidly on such floor, a cased geophysical instrument in said housing, gimbals supporting the instrument casing for self-leveling within the housing, a plurality of clamping devices for securing the casing part and housing part against relative motion and carried by one of said parts, each clamping device including an arm adapted to be moved to engage the part which does not carry it or to engage a stop on the part which does, an electric motor adapted to move said arm slowly in either clamping or unclamping direction, a source of power in said housing for said motor, a reversing switch connected between the source and motor, a pair of coils each adapted when energized to move said switch into one of its two positions, a pair of switches adapted for alternative operation and each adapted to connect one of said coils to said source, means to actuate one of said last mentioned switches on engagement of said arm and the part which does not carry it, means to actuate the other of said switches when the arm and stop engage, and means to stop the motor upon either of said engagements.

8. Apparatus for geophysical prospecting on the floors of bodies of water comprising, in combination, a water-tight housing, means to support the same rigidly on such floor, a cased geophysical instrument in said housing, gimbals supporting the instrument casing for self-leveling within the housing, a plurality of clamping devices for securing the casing part and housing part against relative motion and carried by one of said parts, each clamping device including an arm adapted to be moved to engage the part which does not carry it or to engage a stop on the part which does, an electric motor adapted to move said arm slowly in either clamping or unclamping direction, a source of power in said housing for said motor, a reversing switch connected between the source and motor, a pair of coils each adapted when energized to move said switch into one of its two positions, a pair of switches adapted for alternative operation and each adapted to connect one of said coils to said source, means to actuate one of said last mentioned switches on engagement of said arm and the part which does not carry it, and means to actuate the other of said switches when the arm and stop engage, each of said switches also being arranged to open the circuit to the motor when energizing one of the coils.

9. Apparatus for geophysical prospecting on the floors of bodies of water comprising, in combination, a water-tight housing, means to support the same rigidly on such floor, a cased geophysical instrument in said housing, gimbals supporting the instrument casing for self-leveling within the housing, a plurality of clamping devices for securing the casing part and housing part against relative motion and carried by one of said parts, each clamping device including an arm adapted to be moved to engage the part which does not carry it or to engage a stop on the part which does, an electric motor adapted to move said arm slowly in either clamping or unclamping direction, a source of power in said housing for said motor, a reversing switch connected between the source and motor, a pair of coils each adapted when energized to move said switch into one of its two positions, a pair of switches adapted for alternative operation and each adapted to connect one of said coils to said source, means to actuate one of said last mentioned switches on engagement of said arm and the part which does not carry it, means to actuate the other of said switches when the arm and stop engage, each of said switches also being arranged to open the circuit to the motor when energizing one of the coils, and a switch adapted to be positioned at the surface of the water and arranged to close the motor circuit to start the same in a reversed direction after being stopped by one of said arm engagement actuated switches.

10. Apparatus for geophysical prospecting on the floors of bodies of water comprising, in combination, a water-tight housing, means to support the same rigidly on such floor, a cased geophysical instrument in said housing, gimbals supporting the instrument casing for self-leveling within the housing, a plurality of clamping devices for securing the casing part and housing part against relative motion and carried by one of said parts, each clamping device including an arm adapted to be moved to engage the part which does not carry it or to engage a stop on the part which does, an electric motor adapted to move said arm slowly in either clamping or unclamping direction, a source of power in said housing for said motor, a reversing switch connected between the source and motor, a pair of coils each adapted when energized to move said switch into one of its two positions, a pair of switches adapted for alternative operation and each adapted to connect one of said coils to said source, means to actuate one of said last mentioned switches on engagement of said arm and the part which does not carry it, means to actuate the other of said switches when the arm and stop engage, each of said switches also being arranged to open the circuit to the motor when energizing one of the coils, a switch adapted to be positioned at the surface of the water and arranged to close the motor circuit to start the same in a reversed direction after being stopped by one of said arm engagement actuated switches, said pair of switches being biased to motor circuit closing position and serially arranged in the motor circuit, and means under the joint control of the surface switch and arm engagement to open either of said switches of the pair to stop the motor and to energize one of the reversing switch coils.

11. Apparatus for geophysical prospecting on the floors of bodies of water comprising, in combination, a water-tight housing, means to support the same rigidly on such a floor, a cased geophysical instrument in said housing, gimbals supporting the instrument casing for self-leveling within the housing, clamping means adapted to be extended between the housing and casing to lock them against relative movement, a motor adapted to move said means slowly to clamping position, a control to start the motor from the water surface, and means to stop said motor automatically when the movement of said clamping means to clamping position is complete.

ARTHUR F. HASBROOK.